United States Patent
Van Teeffelen et al.

(10) Patent No.: US 12,035,850 B2
(45) Date of Patent: Jul. 16, 2024

(54) METHOD FOR CONTROL OF MULTI-FUNCTIONAL COOKING APPARATUSES

(71) Applicant: Vorwerk & Co. Interholding GmbH, Wuppertal (DE)

(72) Inventors: Niklas Van Teeffelen, Düsseldorf (DE); Philipp Charopoulos, Düsseldorf (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 589 days.

(21) Appl. No.: 16/991,119

(22) Filed: Aug. 12, 2020

(65) Prior Publication Data
US 2021/0045585 A1 Feb. 18, 2021

(30) Foreign Application Priority Data

Aug. 15, 2019 (EP) ...................................... 19191914

(51) Int. Cl.
*A47J 44/00* (2006.01)
*A47J 27/00* (2006.01)

(52) U.S. Cl.
CPC ............... *A47J 44/00* (2013.01); *A47J 27/00* (2013.01)

(58) Field of Classification Search
CPC .................................. A47J 44/00; A47J 27/00
See application file for complete search history.

(56) References Cited

U.S. PATENT DOCUMENTS

| | | | |
|---|---|---|---|
| 2016/0073814 A1* | 3/2016 | Kiriishi | A47J 27/04 99/348 |
| 2018/0018903 A1* | 1/2018 | Koennings | G09B 19/0092 |
| 2020/0146496 A1* | 5/2020 | Patadia | A47J 36/321 |

* cited by examiner

*Primary Examiner* — Nathaniel E Wiehe
*Assistant Examiner* — Keith Brian Assante
(74) *Attorney, Agent, or Firm* — Brake Hughes Bellermann LLP

(57) ABSTRACT

A method for controlling multi-function cooking apparatus devices uses a control system with a recipe program interface to receive at least one recipe program configured to control functions of the multi-function cooking apparatus devices. For each food processing step, the recipe program provides information about the technical capabilities required, and a A program analyzer module identifies, for a particular food processing step, at least one particular slave providing a reduced functional scope with technical capabilities which are sufficient to execute said particular food processing step, and extracts from the at least one recipe program a partition. A recipe deployment module deploys the extracted partition to the at least one particular slave for execution, and further deploys the remaining program partition of the recipe program to the master.

9 Claims, 8 Drawing Sheets

| step | text | code instructions |
|---|---|---|
| 1 | Place chicken breasts in steam cooking dish, season with salt and pepper and set aside | |
| 2 | Place Edam cheese in mixing bowl and grate | Time = 10 sec<br>Speed = 5 |
| 3 | Transfer to a bowl and set aside | |
| 4 | Preheat oven | Temp = 200 |
| 5 | Place olive oil, onions and garlic cloves in mixing bowl and chop | Time = 5 sec<br>Speed = 5<br>Direction = chop |
| 6 | then sauté | Time = 5 min<br>Temp = 120<br>Speed = 1<br>Torque = 1 |
| 7 | Add tomatoes, stock cube and sugar and set steam cooking dish in position and steam | Time = 25 min<br>Steam = on<br>Speed = 1<br>Torque = 1 |
| 8 | Remove food, keep warm and clean bowl | Clean = on |
| 9 | Place water in mixing bowl and bring to the boil | Time = 14 min<br>Temp = 100<br>Speed = 1<br>Torque = 1 |
| 10 | place chicken breasts in a baking dish, cover with tomato sauce and reserved grated Edam cheese and sprinkle with oregano. Bake until cheese becomes golden brown | Time = 10 min<br>Temp = 200 |
| 11 | Add salt and dried pasta through hole in the mixing bowl lid and cook | Time = 9 min<br>Temp = 100<br>Speed = 1<br>Torque = 1 |
| 12 | Drain pasta through steam cooking dish and serve hot with chicken breasts pizzaiola | |

| step | text | code instructions |
|---|---|---|
| 1.1 | Place chicken breasts in steam cooking dish, season with salt and pepper and set aside | |
| 1.2 | Place Edam cheese in mixing bowl and grate | Time = 10 sec<br>*Speed = 5* |
| 1.3 | Transfer to a bowl and set aside | |
| 1e.4 | Preheat oven | *Temp = 200* |
| 1.5 | Place olive oil, onions and garlic cloves in mixing bowl and chop | Time = 5 sec<br>*Speed = 5*<br>*Driection = chop* |
| 2.6 | Move to slave, then sauté | Time = 5 min<br>Temp = 120<br>Speed = 1<br>Torque = 1 |
| 2.7 | Add tomatoes, stock cube and sugar and set steam cooking dish in position and steam | Time = 25 min<br>Steam = on<br>Speed = 1<br>Torque = 1 |
| ~~8~~ | ~~Remove food, keep warm and clean bowl~~ | ~~Clean = on~~ |
| 1.9 | Place water in mixing bowl of the master and bring to the boil (start in parallel to step 2.7) | Time = 14 min<br>Temp = 100<br>Speed = 1<br>Torque = 1 |
| 1e.10 | place chicken breasts in a baking dish, cover with tomato sauce and reserved grated Edam cheese and sprinkle with oregano. Bake until cheese becomes golden brown | Time = 10 min<br>*Temp = 200* |
| 1.11 | Add salt and dried pasta through hole in the mixing bowl lid and cook | Time = 9 min<br>Temp = 100<br>Speed = 1<br>Torque = 1 |
| 1.12 | Drain pasta through steam cooking dish and serve hot with chicken breasts pizzaiola | |

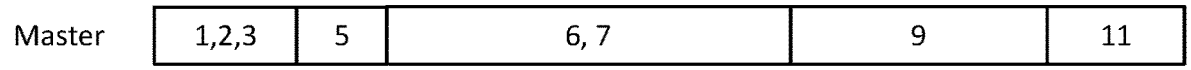
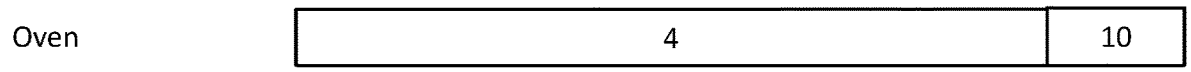
FIG. 5A
FIG. 5B
FIG. 5C

METHOD FOR CONTROL OF MULTI-FUNCTIONAL COOKING APPARATUSES

PRIORITY

This application claims priority from European patent application number 19191914.1 filed on Aug. 15, 2019, the contents of which is incorporated herein by reference.

TECHNICAL FIELD

The present invention generally relates to cooking apparatuses, and more particularly, relates to operating a plurality of cooking apparatuses with different functional scopes based on a master recipe program.

BACKGROUND

Cooking apparatuses (cooking devices) have become more and more intelligent in the recent past by integrating multiple functions into the apparatus. For example, modern cooking devices integrate functions, such as heating, mixing, boiling, pureeing, etc., in a single multi-function cooking device. A cooking device typically has to be operated with appropriate technical parameter settings (e.g., temperature settings, rotational speed settings, etc.) to ensure proper operation. Proper operation of a cooking device as used hereinafter refers to correct, safe and/or secure operation for producing reproducible cooking results with the cooking apparatus with regards to a particular food product.

Typically, the functions of such a multi-functional cooking apparatus are controlled by one or more recipe programs which have instructions that are sequentially executed to arrive at the prepared food product or menu. Typically, a recipe program is loaded into the cooking apparatus for preparing a certain course of the menu and the courses are prepared by processing the separate recipe programs in the corresponding sequence. However, a recipe program may also include program instructions related to food processing steps of two or more courses (or the entire menu). Food products which result from such complex food processing steps are referred to as complex food products herein.

Typically, a multi-functional cooking apparatus has an interface for the reception of a cooking vessel which is equipped with at least one of a temperature control element and a torque and rotation transmission element. In a torque and rotation transmission element, torque and rotation speed can be varied independently. For example, when stirring soup, low rotation speed an low torque is needed. However, when kneading dough, low rotation speed but high torque is required. Sometimes a torque and rotation transmission element is implemented by a so-called heating-and-stirring element. Sometimes, multiple vessels are used in the context of preparing a meal wherein, of course, only one vessel at a time can be mounted to the cooking apparatus. That is, only sequential processing of the recipe instructions is possible even with multiple vessels (bowls) available. Nevertheless, using more than one vessel with a cooking apparatus according to the predefined recipe program may result in a less efficient food processing method with interrupts caused by the exchange of vessels. There is therefore a desire to improve the efficiency of food processing involving a multi-function cooking apparatus.

SUMMARY

Additional cooking apparatuses can be used for parallelizing the execution of certain food processing steps. However, multi-functional cooking apparatuses are typically complex devices which provide many high-performance cooking functions but which also require a lot of safety features to ensure safety of the cooking user when operating the apparatus. On the other hand, many food processing steps do not make use of the high-performance cooking functions of the cooking apparatus at all. Users typically refrain from operating multiple multi-functional high-performance cooking apparatuses in parallel and accept the resulting food processing inefficiencies which especially occur when preparing complex food products. A complex food product typically includes multiple food components that need to be prepared separately because at least one food component includes ingredients which are not compatible ingredients of with the at least one further food component, and/or because the recipe program instructions relate to food processing steps with control parameter settings which are not compatible with the control parameter settings of food processing steps of the at least one further food component. For preparing such complex food products, typically multiple vessels are used.

Therefore, it is a problem to improve the efficiency of food processing for recipe programs for which the use of multiple vessels is advantageous.

The above technical problem is solved by the embodiments of the invention as described in the independent claims.

In one embodiment, a control system is provided for controlling at least two cooking apparatuses. One of the cooking apparatuses (typically a high-performance multi-function cooking apparatus) is acting as a master and at least a further cooking apparatus is acting in the role of a slave. The master is the leading cooking device in the food processing and is designed to support cooking steps listed in a (master) recipe program, and, in cases where the control system is integrated in the master, also to delegate certain steps of the recipe program to available slaves. A slave is a device with a reduced functional scope which is sufficient to perform at least a subset of the cooking steps in the recipe program. This subset of the recipe steps may be specialized or tailored for a particular slave. That is, a slave supports only a reduced functional scope compared to the master but may perform specialized steps, which could be performed by the master only with a lower quality or which may not be executable by the master at all. For example, a slave may be designed for executing frying steps in a pan which has an interface that fits into the slave but which may not be compatible with the master's interface. The master might only execute frying steps in its standard master vessel. Executing the frying steps in a pan may however lead to an improved quality of the food product. The reduced functional scope may affect anyone of the following technical capabilities of a slave: maximum temperature reachable with the temperature control element inside the vessel, temperature accuracy reachable with the temperature control element inside the vessel, maximum rotational speed reachable for the torque and rotation transmission element, rotation direction of the torque and rotation transmission stirring element, and torque of the torque and rotation transmission element. In other words, the reduced functional scope of a slave may be limited by a limited range for the cooking parameters, such as temperature, speed, torque, etc. It may also be limited in that certain functions (e.g., chopping) are not supported at all by the slave. Thereby, the functional scope may exist only with regards to a particular technical capability for supporting a cooking function (e.g., only a lower temperature range, or only a lower speed range), whereas other technical capabilities may even have an extended scope. For example, a reduced functional scope is already present when a particular slave provides a reduced speed range or does not even at all support a torque and rotation transmission element although the slave allows for a higher maximum temperature than the master.

In case the reduced functional scope of the slave relates to such functions where corresponding high-performance functions of the master require particular safety provisions for the master, the slave may be operable without such safety provisions. For example, if the reduced functional scope affects at least one cooking function of the slave in that a technical capability of the slave is limited to a low risk parameter range which excludes parameters of a high risk parameter range being supported by the master and requiring appropriate safety provisions for the respective cooking apparatus, then the slave does not need to be equipped with such safety provisions. This allows to use very basic cooking apparatuses as slaves which provide only some basic cooking functions but which do not provide any advanced functions, such as for example, chopping, high temperature baking, etc., which require implementations of corresponding safety provisions.

The cooking apparatuses are controlled in such a way that they jointly process one or more food products. For example, the control system, the master and the slave(s) can be communicatively coupled via a communication network, such as a local area network, a wireless network, or a mobile network. The control system may also be an integral component of the master.

The master and the slave(s) have a mechanical interface and an associated electrical interface for the reception of a food processing vessel. Thereby, each master specific vessel fits into the interface of the slaves. That is, each slave can continue food processing in a vessel which was earlier used by the master. There may also be slave specific vessels (e.g., a pan) which can be operated by the slaves but which may not necessarily fit into the cooking apparatus master. Each vessel has at least one of a temperature control element and a torque and rotation transmission element. In case of the identical interfaces on master and slave(s), each vessel can be easily be plugged into each cooking apparatus and can then be operated by any of the used cooking apparatuses.

In one embodiment, the electrical interface of a slave may be configurable to predefine the interaction with a corresponding electrical interface of the vessel. For example, the pins of the electrical interface for controlling the rotation direction of the torque and rotation transmission element may be switched in the slave to suppress a rotation which would put the slave into a cutting or chopping mode. Rather, by switching the pins only a rotation in a safe mode is possible for the slave.

The control system has a recipe program interface to receive at least one recipe program for preparing one or more food products. The at least one recipe program includes machine readable recipe program instructions configured to control functions of a cooking apparatus for executing food processing steps in accordance with the least one recipe program. The program instructions may be related to control functions of the master, but they may also include external instructions to control external appliances, such as an oven or a microwave. For each food processing step, the recipe program provides information about the technical capabilities required for the execution of the food processing step. For example, the program may specify a minimum speed or a minimum temperature which has to be provided by the cooking apparatus executing this step.

Further, the control system has a program analyzer module to identify, for a particular food processing step, at least one particular slave with a reduced functional scope that still provides technical capabilities which are sufficient to execute said particular food processing step. Such identification is achieved by matching the capabilities of the available slaves with the technical requirements of the respective recipe program steps. For example, the available slaves may be registered in a slave registry where for each slave the technical capabilities are stored in a digital format which can be interpreted by the program analyzer. Based on this matching result, the program analyzer extracts from the at least one recipe program a partition which includes a program instruction subset associated with said particular food processing step. The partitioning is based on partitioning rules which may be an integral part of the program analyzer or which may be accessible by the program analyzer via a corresponding interface. Such partitioning rules can analyze the recipe program for certain trigger instructions which indicate that certain steps of the recipe program may be moved to a slave. Partitioning rules may also be defined to extract program partitions that increase the efficiency of the food processing method by parallelizing cooking steps where appropriate to shorten the processing time and/or energy consumption of the process. Example categories of partitioning rules (apart from the matching of the capabilities of the available slaves with the technical requirements) can include that:

the bowl has to be cleaned,
ingredients of the vessel have to be filled into a different container to be kept warm, stored or processed further,
a step takes a long time or the volume of the vessel is not big enough (e.g., in case the recipe is scalable with regards to the amount of the ingredients).

The partitioning module can be seen as a checklist that leads either to outsourcing at least one step (i.e. deploying the corresponding recipe instructions to a slave) or not. Any partitioning rule which supports to reduce the total preparation time for a complex food product or reduce necessary cleaning steps to clean cooking vessels may be appropriate. For example, if a cooking step exceeds a predefined cooking time interval (e.g., 10 min), it is can always be advantageous to outsource the step to the slave device because during this predefined cooking time interval the master can be used for more demanding tasks. If the step is shorter than the predefined cooking time interval, then the partitioning module checks whether additional following steps can also be performed on the slave. If yes, and if the aggregate preparation time of such cooking steps adds up to at least the duration of the predefined cooking time interval, then this entire group of steps can be outsourced to the slave. If a step or a set of steps includes the last step before a particular course of a multi course menu is finished, then such step(s) can always be outsourced, even if their aggregate duration is shorter than the predefined time interval.

Further, the control system has a recipe deployment module to deploy the extracted partition to at least one particular slave for execution. Thereby, the remaining program partition of the recipe program (including program instructions not deployed to the slave) are deployed to the master.

The disclosed control system can be used to analyze a recipe program with regards to its potential of being executed in parallel on multiple cooking apparatuses with a master and one or more slaves. As the examples in the detailed description demonstrate, this allows to achieve efficiency gains in the execution of the food processing steps and shorten the overall processing time—in some cases by eliminating steps from the original recipe program which are not necessary anymore in a distributed cooking scenario controlled by the recipe program partitions deployed to the corresponding cooking apparatuses. In some cases, the overall energy consumption caused by the execution of the recipe program can be reduced.

In one embodiment, a computer-implemented method is provided for controlling a multi-function cooking apparatus master and at least one multi-function cooking apparatus slave. Each cooking apparatus provides a mechanical interface and an associated electrical interface for the reception of a food processing cooking vessel. Thereby, each master specific vessel fits into the interface of the slave. The vessel has at least one of a temperature control element and a torque and rotation transmission element, for jointly processing one or more food products. A slave provides, in comparison with the master, a reduced functional scope with regards to at least one cooking function. The method starts with receiving at least one recipe program for preparing one or more food products. The at least one recipe program includes machine readable recipe program instructions configured to control functions of a cooking apparatus for executing food processing steps in accordance with the least one recipe program. For each food processing step, the recipe program provides information about the technical capabilities required for the execution of the food processing step. Thereby, some program instructions are executable by the master and a slave because master and slave provide the required capabilities.

Then, for a particular food processing step, at least one particular slave is identified providing a reduced functional scope with technical capabilities which are sufficient to execute said particular food processing step. From the at least one recipe program a program partition is extracted including a program instruction subset associated with the particular food processing step. The extracted partition is then deployed to the at least one particular slave for execution, and deploying the remaining program partition of the recipe program to the master.

In one example, the extracted partition may include recipe instructions to continue food processing steps previously executed by the master in a particular vessel by using the (same) particular vessel with the slave in combination with the program instruction subset of the extracted partition. In another example, the extracted partition may include recipe instructions to perform a food processing step using the particular vessel with the slave in combination with the program instruction subset of the extracted partition to be continued with food processing steps subsequently executed by the master in combination with the program instructions of the remaining partition deployed to the master.

In one example, the extracted partition may be deployed to multiple slaves to execute the partition in parallel on two or more cooking apparatuses. This option may be advantageous if larger quantities of a particular food component need to be prepared but a single vessel would be too small for this purpose. By parallelizing the food component preparation using multiple slaves the preparation time is reduced and energy can be saved because there is no need to keep portions of the food component warm because they were already prepared earlier. Rather, using the parallel version, all parallel food component processes end at the substantially the same point in time (assuming that the parallel processes were also started at substantially the same point in time.

In one embodiment using multiple slaves, for a further food processing step, a further slave providing a reduced functional scope may be identified with technical capabilities which are sufficient to execute said further food processing step. Then, a further partition is extracted from the recipe program with a program instruction subset associated with the further food processing step. The extracted further partition is then deployed to the further slave for execution, while the program instructions of the remaining partition of the recipe program are deployed to the master.

In one embodiment, a computer program product is provided for controlling a multi-function cooking apparatus master and at least one multi-function cooking apparatus slave. The computer program product has computer readable instructions that when loaded into a memory of a computing device and executed by at least one processor of the computing device cause the computing device to perform the method disclosed herein.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

BRIEF DESCRIPTION OF THE DRAWINGS

FIG. 4A illustrates an example recipe program for preparing a complex food product;

FIG. 4B illustrates a partitioned recipe program generated based on the example receipt program according to an embodiment;

FIGS. 5A to 5C illustrate efficiency gains which are achieved by the deployment of master and slave partitions of the partitioned recipe program;

DETAILED DESCRIPTION

Figure 1:
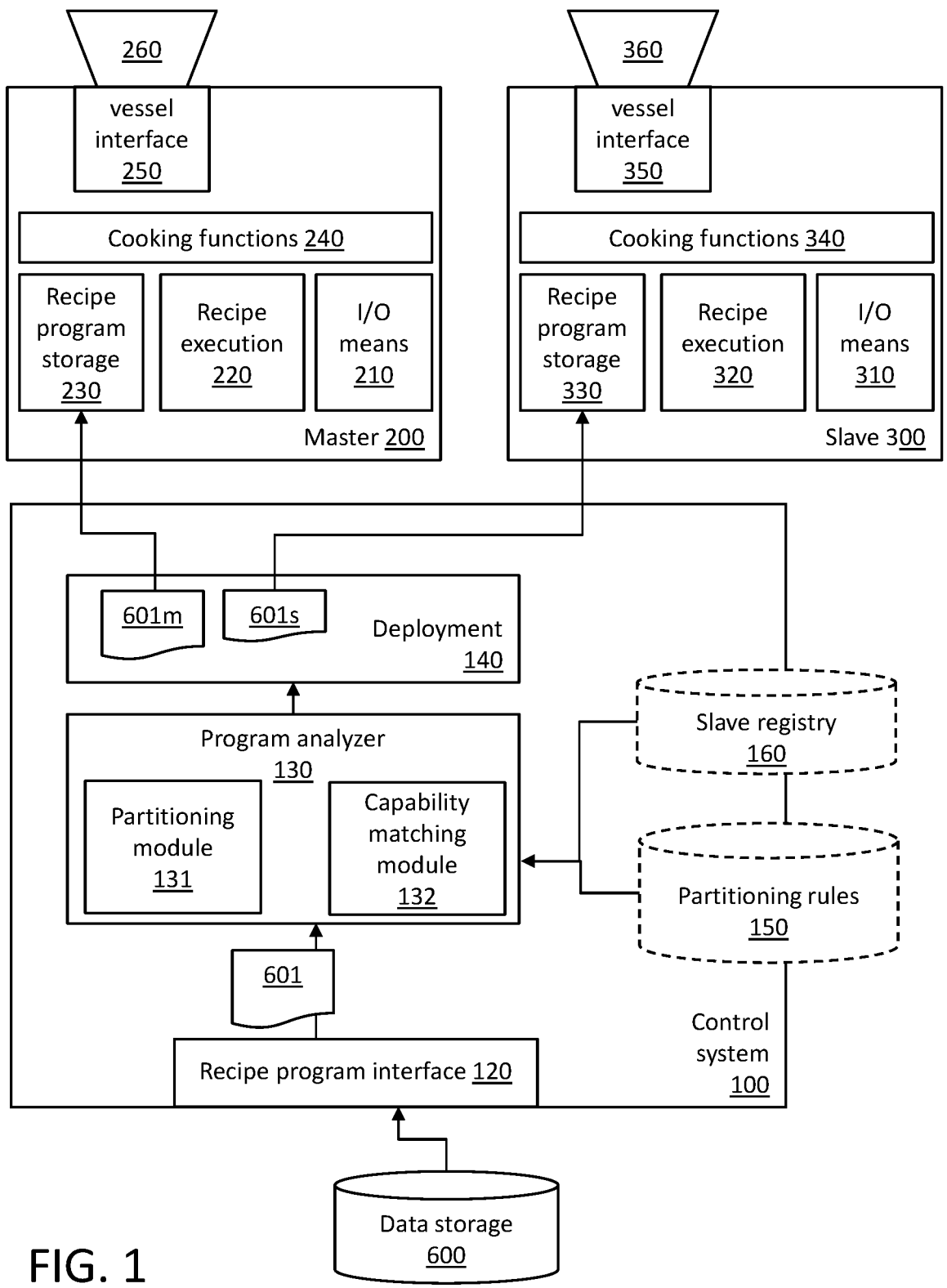
FIG. 1 illustrates an example of a cooking apparatus master and a slave controlled by a control system according to an embodiment.
Figure 3:
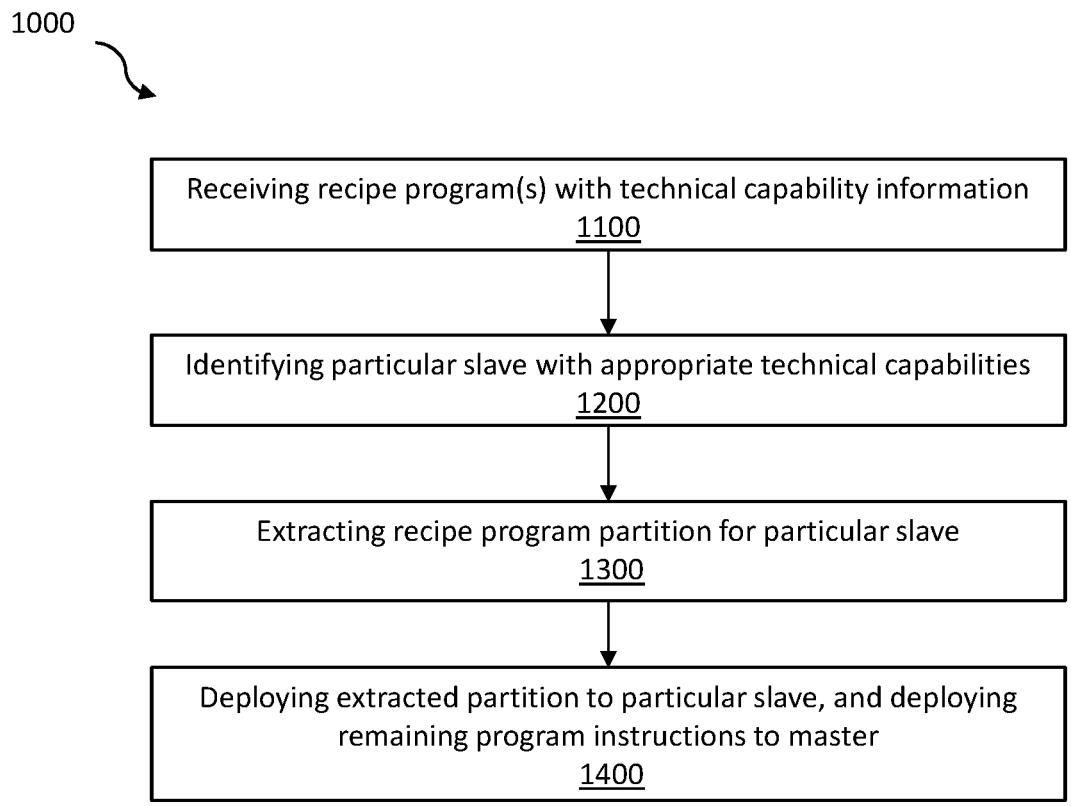
FIG. 3 is a simplified flow chart of a computer-implemented method which is executed by a control system according to an embodiment.

FIG. 1 illustrates a control system 100 which is communicatively coupled to a master cooking apparatus 200 and to a slave cooking apparatus 300. FIG. 3 is a simplified flow chart of a computer-implemented method 1000 which can be executed by the control system 100. FIG. 1 is described in the context of FIG. 3. Therefore, the following description refers to reference numbers of FIG. 1 and FIG. 3.

The control system 100 provides partitions 601m, 601s of a recipe program 601 to the master 200 and slave 300, respectively. Each cooking apparatus may have a recipe program storage 230, 330 to store the received partitions 601m, 601s. Further, each cooking apparatus has a recipe execution engine 220, 320 to execute the stored partitions.

When executing a partition, respective cooking function 240, 340 are invoked in the corresponding cooking apparatus 200, 300. For example, the speed of a motor or the power of a heating element are controlled to adjust the cooking function in accordance with technical control instructions included in the program instructions of the respective partitions. Typically, the cooking apparatuses also have input/output (I/O) means 210, 310 allowing a human user to interact with the cooking apparatuses.

Each cooking apparatus has a vessel interface 250, 350 which is adapted to provide a receipt for a corresponding vessel 260, 360. The vessel interfaces have a mechanical and an electrical part. For some vessels, the mechanical part can be designed in such a way that each of the vessels 260, 360 fits into each of the vessel interfaces 250, 350. In such case, the vessel 260 can also be inserted into the slave interface 350 and the vessel 360 can also be inserted into the master interface. A vessel which fits into the master also fits into any of the slave interfaces. However, not every slave specific vessel needs necessarily to fit into the master interface. The electrical part is designed in such a way that control signals for the various cooking functions can be propagated to the corresponding vessel components. For example, a vessel typically includes a temperature control element (e.g., a heating element with a corresponding temperature sensor) and/or a torque and rotation transmission element (e.g., a rotatable stirring or cutting element). Such vessel components are controlled via the electrical part of the vessel interface.

For example, the vessel 260 of the master may include a chopping/cutting element. The master has the capability to support the chopping/cutting function by rotating the chopping/cutting element in the cutting direction at sufficiently high speed with a sufficiently high torque. When inserting the vessel 260 into the vessel interface 350 of the slave 300, the slave does not have the technical capabilities to support chopping/cutting functions (e.g., insufficient maximum speed/torque). Only stirring is supported. Because of that, the slave does not have any safety features implemented which are required for operating the chopping/cutting mode (e.g., the slave does not provide a lid which can be locked during chopping/cutting mode so that the user cannot accidentally reach into the pot.) Nevertheless, there is now a risk that when the chopping/cutting element of the vessel 260 is operated in the stirring mode but in the cutting direction, that the user can be severely injured when reaching into the pot with her fingers. For this purpose, the slave may include a switch which can automatically switch the output pins controlling the stirring direction when the slave detects that a vessel is inserted with a chopping/cutting element. The vessel may have a tag characterizing the vessel as a chopping/cutting vessel. This tag may be read by a corresponding reader of the slave to identify the vessel accordingly. Other identification methods known by the skilled person may be used (e.g., a certain pin in the electrical interface may be used for the identification of such vessel components). When the switch automatically provides the control signal to change the rotation direction, the chopping/cutting element is rotating in the non-cutting direction to ensure safety of the food processing steps for executing the stirring function of the slave 300.

In one embodiment, the control system 100 can be run on a separate computer which can communicate with the master 200 and slave 300. Alternatively, the control system 200 can be an integrated component of the master 200. In this case, the program instructions in the respective recipe program partitions deployed to the master can be sent via an internal bus of the master 200. Program instructions deployed to the client are sent via a communication network (e.g., a wireless network available in the cooking environment, or even a wired local network).

Once a recipe for the preparation of a particular complex food product is selected (for example, by a user via the I/O means 210 of the master 200), the master can send an instruction (not shown) to the control system 100 to obtain a corresponding recipe program 601 from a data storage 600 (recipe database). The data storage device 600 can be any device with a memory for storing data in electronic format (e.g., a memory stick/card, a memory disk on a remote server, etc.). In some embodiments, the data storage device may be physically connected with the cooking apparatus (e.g., via a USB plug). In other embodiments, the data storage device may be connected via an appropriate network connection (e.g., LAN, WAN or WLAN connection). The data storage device may have a database or a file system to store recipe programs which are intended to be executed by the cooking apparatus. An example of a possible structure for a separate recipe program example is disclosed in the context of FIG. 4A. A recipe program is a digital recipe which includes a plurality of control instructions (referred to as recipe program instructions or program instructions herein) with technical parameter settings to control food processing steps performed by functions of the cooking apparatus when the recipe program is executed by a recipe execution component of the cooking apparatus.

The recipe program 601 is designed for execution by the master 200. That is, the program is designed based on the assumption that all program instructions of the recipe program are executed by the recipe execution engine 220 of the master 200 to invoke the corresponding cooking functions 240. In other words, the recipe programs stored in the data storage 600 are typically based on the assumption that all cooking steps are performed by a single multi-function cooking apparatus. The control system receives 1100 the recipe program 601 via its interface 120 and analyzes the recipe program with its program analyzer 130 to evaluate if the obtained recipe can be optimized for a more efficient execution in view of the available cooking apparatuses 200, 300. For each program step of the recipe program 601 the technical capabilities required to execute the respective step are coded in the recipe program. The coding may be explicit or implicit. For example, a rotation speed level or a target temperature value may be explicitly coded in the program instructions. A torque level may sometimes be implicitly derivable from the cooking function. For example, a chopping mode provided as a program instruction parameter may be associated with a torque level of higher than 4.

The program analyzer 130 has a capability matching module 132 and a partitioning module 131. The capability matching module knows which cooking apparatuses besides the master 300 are available for executing the food processing steps in accordance with the recipe program 601. For example, the capability matching module 132 may include hard coded information about the availability of slave 300 and its technical capabilities. Optionally, a slave registry 160 may be used which is accessible by the program analyzer 130. The slave registry may be an internal component of the control system 100 or it may run on a remote system. The slave registry allows each slave to register with the corresponding technical capabilities supported by the slave. For example, slave 300 may be registered in the registry 160 with the cooking functions stirring and heating and the technical capabilities of a maximum speed level 2, a maximum torque level 2, and a maximum reachable temperature of 120 degrees C. Further slaves (not shown) may be registered. For example, one slave may only support stirring, another slave may only supports low temperature heating, whereas yet another slave may support baking but with a maximum reachable temperature of 280 degrees C. but not including any stirring, cutting or chopping functions. Each of such slaves can register in the registry 160 with the respective capabilities and the information can be retrieved by the program analyzer 130 to be provided to its modules.

The capability matching module 132 can now analyze the program instructions in 601 and compare the technical capability requirements of each program step with the capabilities of the available (or registered) slave(s) to identify 1200, for a particular food processing step (i.e. for one or more program instructions associated with the particular food processing step), at least one particular slave providing a reduced functional scope with technical capabilities which are sufficient to execute said particular food processing step. The output of the capability matching module is a mapping between recipe program instruction and available master/slave appliances which can execute the respective program step. Of course, each step is executable by the master 200 as the program was designed for execution by the master. However, some steps in the program may also be executable by one or more of the available slaves. This mapping is provided to the partitioning module 131. Of course, a person skilled in the art will understand that the different modules may also be implemented by a single computer program. The term module is introduced to separate between different functions performed by the controls system irrespective of any particular implementation. In the example, at least some of cooking steps in accordance with the recipe program require only a reduced functional scope with technical capabilities which are provided by the slave 300. As a result of the capability matching, slave 300 is assigned to some of the recipe program instructions as potential candidate to execute the corresponding food processing steps.

The partitioning module evaluates the recipe program 131 in the context of the slave mapping to determine if a partitioning of the recipe program 601 into a partition 601s with instructions to be executed by the slave 300, and into a partition 601m with instructions to be executed by the master 200 can lead to any efficiency gains for the food processing of the complex food product. For this purpose, the partitioning module 131 uses a set of partitioning rules 150 which may be an integral part of the partitioning module itself or which may be accessible by the partitioning module at a remote storage location. Such partitioning rules are designed to identify whether a parallelization of recipe program steps is possible when using the mapped cooking apparatus for jointly processing the food product by separating the preparation of the different food components on different cooking apparatuses. Further, a partitioning is applied in cases where an efficiency gain can be achieved with regards to the overall food processing time and/or an efficiency gain can be achieved in the energy consumption of the food processing. A gain in energy consumption is achieved if the execution of the recipe program on master and slave consumes less energy than the execution on the master alone. For example, a cooking step which involves heating and stirring consumes less energy when being executed on a slave with an energy saving low power motor (which is still sufficient to perform the task) than when being executed by the high power motor of the master. Once the partitioning module has determined that a meaningful partitioning of the recipe program 601 is possible so that a subset of the program instructions can be executed by the identified slave 300, the partitioning module extracts 1300 a partition 601s from the recipe program 601 with the partition 601s including a program instruction subset associated with the particular food processing step to be executed by the slave 300.

In the example, the partitioning module concluded that the efficiency of the overall food processing is improved when some recipe program steps are executed by the slave instead of the master. Therefore, the partitioning module has extracted 1300 a slave partition 601s with recipe instructions to be executed by the execution engine 320 of the slave. This partition 601s is then deployed 1400 to the slave 300. The remaining program instructions are collected in the master partition 601m and deployed to the master 200 for execution.

Figure 2:
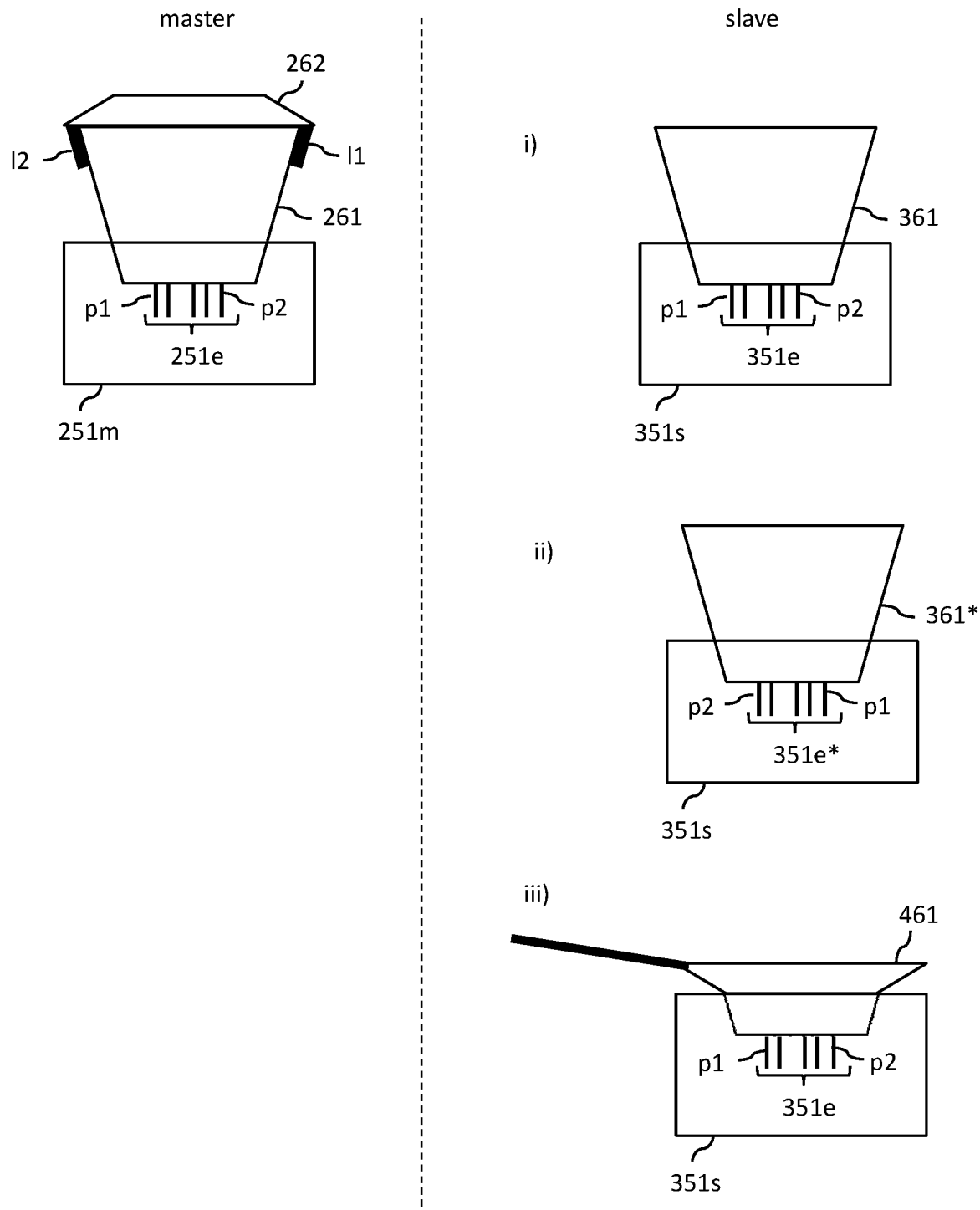
FIG. 2 illustrates examples of a multi-function cooking apparatus as the master and various embodiments of slave cooking apparatuses.

Turning briefly to FIG. 2, the figure shows on the left hand a multi-function cooking apparatus 251m with a vessel 261 which is inserted into the cooking apparatus 251m via its mechanical interface (indicated by the overlapping area of vessel 261 and the cooking apparatus 251m). The electrical interface 251e of includes a plurality of pins including the pins p1 and p2. As the multifunction-cooking apparatus 251 supports as the master all the cooking function required to execute a recipe program, certain safety provisions are taken. For example, the vessel 261 is operated with a lid 262 which can even be locked with locks 11, 12 to prevent that the user can be injured by reaching into the vessel during operation and/or to prevent hot liquid from spurting out from the vessel when the liquid starts boiling or the rotation of the torque and transmission element exceeds a certain rotational speed.

On the right hand, FIG. 2 illustrates a slave 351s in three different application scenarios i), ii), iii) with different vessels 361, 361*, and 461.

In the first scenario i) it is assumed that the vessel 261 which was previously inserted in the master 251m has been moved to the slave 351s. However, because the slave does not support functions which require special safety provisions, the lid 262 is removed. For example, the vessel 361 may be equipped with a heating and a stirring element. The slave 351s may not be able to generate temperatures in the vessel which involve a risk of spurting. The vessel is referenced as vessel 361 while being placed in the slave. The electrical interface 351e of the slave corresponds to the electrical interface 251e with the same pin configuration including pins p1 and p2. For example, scenario i) can be applied if stirring of the food component at relatively low temperatures is applied for a substantial amount of time (e.g. 10 minutes of more).

In the second scenario ii), a similar vessel 361* as in scenario ii) is inserted into the slave 351s. However, in ii) the vessel is equipped with a torque and rotation transmission element having blades which were used for chopping and cutting by the master. In this case, a switch of the slave can be used to change the electrical interface 351* by switching the pins p1 and p2 in the pin configuration. By applying this switching, the torque and rotation transmission element of the vessel 361* is rotated in the opposite rotation direction in case this element has blades. By changing the rotation direction no safety provisions are necessary anymore because the sharp side of the blades becomes non-hazardous to the user with the changed rotation direction. Alternatively, such a switch may be implemented as a software switch where the pins of the vessel indicate to the slave that the vessel includes a torque and rotation transmission element with blades. Once such a vessel is detected, the slave generates control signals for the motor which cause the motor to change the rotation direction into the non-cutting direction. In other words, the slave firstly detects that the particular vessel includes a torque and rotation transmission element with blades in a cutting rotation direction. The detection of the torque and rotation transmission element type can be implemented, for example, via the pins of a particular food processing vessel inserted into the slave, or via another identification technology including RFID tags or the like. Secondly, the slave generates control signals for the motor of the slave to set the rotation direction to the non-cutting rotation direction. As a consequence, the risk for a user of being hurt when reaching into the vessel during operation is reduced because the blades will not hit the user's hand.

In the third scenario iii), the vessel is a pan 461 which has no torque and rotation transmission element at all. Simply a heating element is required, for example for frying a food component. In this case, the electrical interface 351e remains unchanged in comparison to scenario i) and the pins p1, p2 which are relevant for rotation direction control are not used at all in this scenario.

In case multiple slaves are available, all three slave scenarios may be operated in parallel when performing the processing of a complex food product (e.g., a multi-course menu) which includes a plurality of food components. For example, a first slave (scenario i) may be used to continue a cooking process of a food component which was initially prepared on the master (e.g., with a chopping function) but which now can continue with stirring at lower speed and lower temperature. The corresponding recipe instructions are then extracted from the original recipe program and deployed to the slave 351s i).

For example, the second slave in scenario ii) may be used to prepare a soup which does not require any chopping/cutting functions but simply requires continuous stirring at relatively low temperature. The corresponding recipe instructions are then extracted from the original recipe program and deployed to the slave 351s ii).

For example, the third slave in scenario iii) may be used to prepare a steak in the pan 461 for which no rotation transmission element is needed at all. The slave 351s iii) only need to support a heating function for operating the pan 461. The corresponding recipe instructions are then extracted from the original recipe program and deployed to the slave 351s iii). Executing the scenarios in parallel may allow for considerable efficiency gains in the overall food processing time for the complex food product.

FIG. 4A illustrates a simplified recipe program 501 for the master cooking device. The capability matching module of the control system parses the recipe program 501 and identifies technical capabilities which are needed by a respective cooking device to execute the respective program steps 1 to 12. The recipe is for preparing a complex food product which even requires the cleaning of the bowl in step 8 to continue with the preparation of pasta while during this time the previously cooked food components need to be kept warm.

FIG. 5A illustrates the sequential processing of the cooking steps performed by the master in a simplified representation in a simplified phase diagram. The ratios of the various phases are not in proportion to the figures of the corresponding recipe instructions but only illustrates the sequential flow of the steps with regards to which phases are executed in parallel. In each phase the reference numbers of the corresponding recipe instructions are used which are processed during the respective phase. In recipe program 501, only the external steps 4, 10 are executed in parallel to the steps executed by the master (by a corresponding oven).

In addition a heater is needed for step 8 to keep a food component warm until it is finally needed to finish a complex food product.

In the example, it is assumed that besides the master cooking device a slave cooking device is available. The master has the technical capabilities to perform all cooking steps of the recipe with the exception of steps 4 and 10 which are performed by an external oven. However, the master can provide the corresponding external control instructions (e.g., Time=15 min, Temp=200) directly to the external oven if a corresponding communicative coupling is available. Otherwise, the external instructions may be provided to a user who can manually apply the respective settings to the oven.

For example, the master can have the capabilities to heat the bowl up to 180 degrees C., to drive the speed of the torque and rotation transmission element at speed levels 1 to 5 with a torque at torque levels 1 to 5. Further, the master may move the torque and rotation transmission element equipped with a blade in a cutting direction to perform chopping of food components.

The slave in the example supports only a reduced functional scope with the following capabilities. The bowl can be heated up to 120 degrees C. The speed range covers speed levels 1 to 3 and the torque range covers the torque levels 1 and 2. Further, it is assumed that the slave lacks certain security features which are present in the master, such as for example, a lid which can be locked. For safety reasons, the slave does not support chopping but only allows to rotate torque and rotation transmission elements equipped with blades into the non-chopping direction. In other words, the slave does not support the vessel to rotate the chopping rotation transmission elements in chopping direction.

The capability matching module can now compare the capabilities provided by the slave with the capabilities required by the various recipe program steps. In the example program 501, steps 2, 4, 5, and 10 are identified as non-executable steps by the slave. However, simply moving all remaining recipe steps to the slave would not make sense because, for example, steps 6 and 7 use different ingredients than steps 9 and 11 and require a cleaning of the bowl in between. The partitioning module receives the potential steps executable by the slave from the capability matching module and then applies partitioning logic to the recipe program to generate meaningful program partitions executable by the master and slave respectively in a way that the overall efficiency of the food processing process is improved.

In general, the partitioning module can be seen as a checklist that leads either to outsourcing of at least one cooking step or not. It pursues the goal to reduce the total preparation time for a complex food product or to reduce necessary cleaning steps to clean cooking vessels. For example, in case a step or a sequence of steps exceeds a predefined timer interval threshold value the partitioning module may take the decision to outsource this step or the entire sequence of steps to a slave. If the step or sequence of steps is shorter than the threshold value, the partitioning module checks, whether additional following steps can also be performed on the slave. If yes, and if the aggregate food processing time adds up to at least the threshold value, the entire group of steps can be outsourced (i.e. deployed to the respective slave). If a particular step or a sequence of steps are the last sept(s) before one course of a multi course menu is finished such step(s) can always be outsourced, even if they take less food processing time than the threshold value.

In the example, the partitioning module has a partitioning rule which identifies a cleaning step in the recipe program as a partitioning indicator because cleaning steps indicate a break in the cooking process which is normally related to a cooking situation where a single bowl is used with the master. However, in cases where a slave with sufficient capabilities is available, a cleaning step in the recipe program can be an ideal trigger to move the bowl currently being used by the master to the slave and continue to process further cooking steps at the master with a second bowl. This may even allow to avoid the cleaning step.

In the example program 501, the partitioning module recognizes that cleaning step 8 basically terminates the steps 1 to 7 because the food component which is ready at step 7 is kept warm in the following until it is needed for finalizing the complex food product. For the recipe execution of recipe 501 an additional heater is needed to perform step 8 (cf. phase diagram FIG. 5A).

FIG. 4B illustrates a partitioned recipe program 502 which was generated based on the initial program 501. The partitioned program 502 has two partitions indicated by a leading "1." (master partition) or "2." (slave partition). The steps identified for the slave partition are steps 2.6 and 2.7 which can be easily executed by the functional scope of the slave. Further, the partitioning module may use partitioning rules which take into account the length of the respective cooking steps. In the example, steps 2.6 and 2.7 add up to 30 min during which the master would be blocked from performing other cooking steps. That is, by transferring the slave partition to the slave and executing the respective steps there, cooking processes can be parallelized and the overall food processing time is reduced.

The slave also has sufficient capabilities to perform steps 1.9 and 1.11. However, by assigning these steps to the slave no further advantage can be gained as the steps would still be executed after the steps 2.6 and 2.7. Therefore, the partitioning module has a rule to recognize that steps 9 and 10 of recipe program 501 can be shifted to a new bowl to avoid the cleaning step which is eliminated in the recipe program 502. This also avoids the need for keeping the first food component warm until its later use (with the extra heater). When using a second bowl, such steps can now be executed by the master (although the capabilities of the slave would be sufficient) to shorten the overall processing time for the complex food product. In the example of FIG. 4B, the partitioning module derives from the recipe instructions that the food component prepared in step 2.7 is needed for further processing in the step with the external instruction 1.e10 which is executed once the water added in step 1.9 has been brought to the boil. The timing in the recipe is selected in a way that the remaining cooking time of step 1e.10 and 1.11 (executed in parallel) is approximately the same so that all food components of the complex food product are ready at approximately the same point in time. This is illustrated also in the phase diagram of FIG. 5B. A further side effect in this recipe is that the preheating phase of the oven 1e.4 is considerably lower than for recipe program 501. Of course, in recipe 501, preheating could have started much later. But in this example, the original program was not ideally defined and preheating over such a long period of time would likely consume more energy than necessary because once the 200 degrees C. are reached the oven has to keep the temperature at this level until step 10. The partitioning module is therefore able to provide a remedy against such poor recipe design by parallelizing cooking steps using the master and the slave according the supported functional scopes.

Step 1.9 can approximately start in parallel with step 2.7 as two different bowls and two different cooking appliances are used. Further The partitioning module can include partitioning rules which try to minimize energy consumption of the cooking appliances. In this example, such a rule is used for shrinking the preheating period of the oven and eliminating the need for keeping the first food component warm during a considerable large time interval.

An alternative embodiment is illustrated in the phase diagram of FIG. 5C, the partitioning module could have identified steps 9 and 11 of program 501 to be deployed to the slave because both steps require only capabilities provided by the slave (as steps 2.9 and 2.11 of the slave partition). Original steps 6 and 7 become part of the master partition as steps 1.6 and 1.7. The overall gain in food processing efficiency is comparable to the partitioning of the embodiment in FIG. 5B. The final choice of the partitioning module regarding which steps are assigned to the master or slave(s) can depend on the set of partitioning rules. For example, there may be preference for certain ingredients for a particular slave. It may also be an option to let the user select a particular partitioning solution via a corresponding user interface in such cases where alternative variants can be pursued which provide similar gains in the food processing efficiency of the complex food product.

Figure 6A:
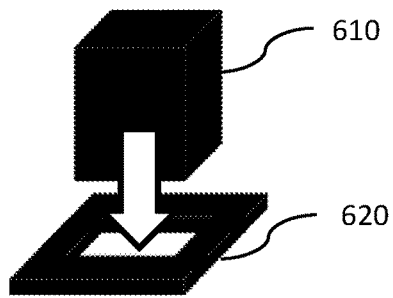
FIGS. 6A, 6B illustrates an example of a safety mechanism using different clutch geometries of master and slave.

FIG. 6A illustrates a schematic view of the coupling between a torque and rotation transmission element and a cooking device (master, slave). The torque and rotation transmission element has a clutch 610 which fits into a corresponding clutch 620 of the cooking device.

Figure 6B:
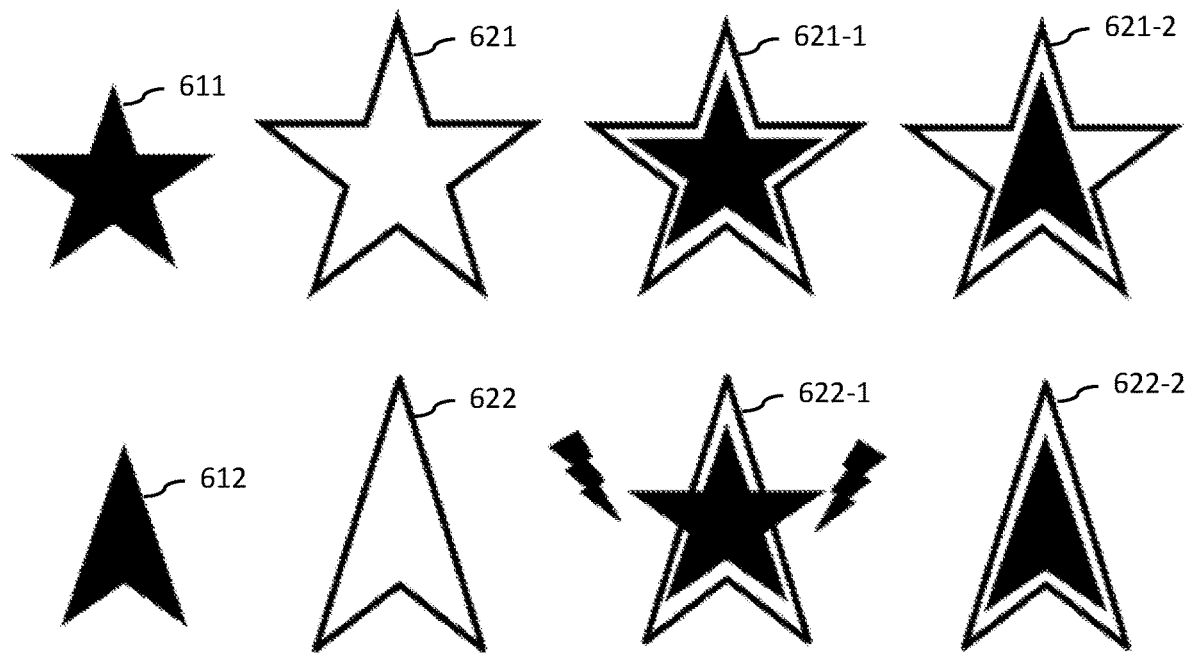

FIG. 6B illustrates different clutch geometries and how such clutch geometries can be used to implement safety provisions using different clutch geometries 621, 622 of the master and the slave and different clutch geometries 611, 612 for different torque and rotation transmission elements. In the example, the geometry 611 is a clutch geometry for a cutting knife, and the geometry 612 is the clutch geometry for a kneading hook. The geometry 621 is the clutch geometry of the master, and geometry 622 is the clutch geometry of the slave. The scenarios 621-1, 621-2, 622-1 and 622-2 illustrate which of the torque and rotation transmission elements can be combined with which device clutch. The master can connect to both elements. In 621-1 the master connects to the cutting knife and in scenario 621-2 it connects to the kneading hook. The slave can also connect to the kneading hook as illustrated in scenario 622-2. However, the slave fails to connect to the cutting knife because the respective clutches do not show a mechanical fit as shown in scenario 622-1. That is, the mechanical interface between the vessel and the cooking device can prevent dangerous situations by not allowing a cutting knife to be inserted into the slave interface. In such case, the risk caused by a reduced slave capability in that the slave cannot lock the vessel with a lid is mitigated by avoiding such situation completely through the incompatible clutch designs. For example, when the master connects with a bowl (vessel) that features a cutting knife or kneading hook, the master may always lock the lid of the vessel during the cooking process due to the dangers the cutting knife poses (although when operating the kneading hook, the locked lid may be irrelevant). The slave may not support such a lock function at all. By using different mechanical coupling mechanisms for the kneading hook and the cutting knife, the slave can be designed, in that it only interlocks with the clutch of the kneading hook (but not with the clutch of the cutting knife), making a locking of the lid obsolete. Therefore this safety mechanism does not need to be available in the slave device.

In more general terms, the reduced functional scope of the slave affects at least one cooking function of the slave in that the mechanical interface of the slave is limited by a particular configuration of the geometry of the mechanical interface wherein the particular configuration of the geometry of the slave prevents the reception of vessels including a torque and rotation transmission element causing a safety risk for a user.

Figure 7:
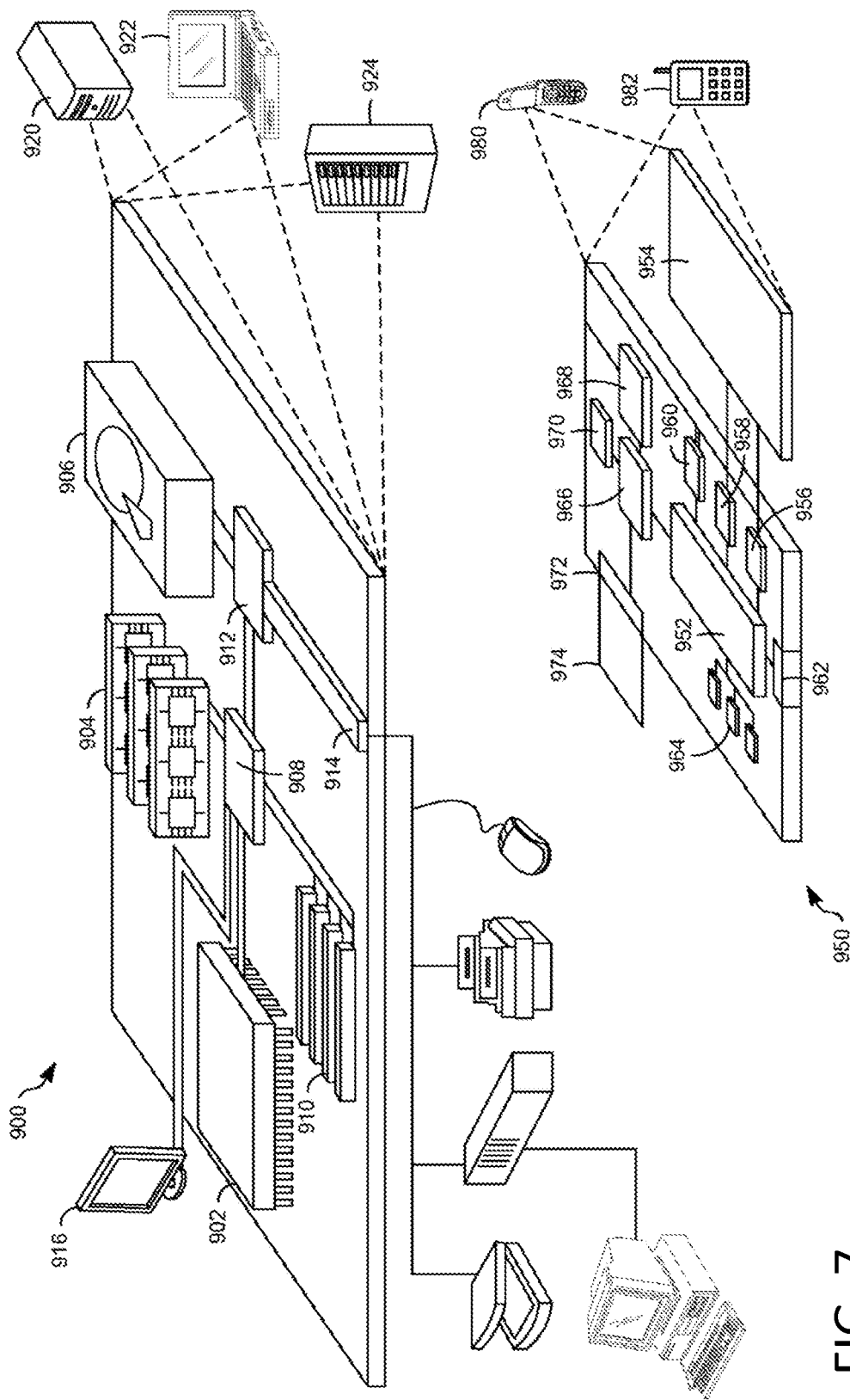
FIG. 7 is a diagram that shows an example of a generic computer device and a generic mobile computer device, which may be used in embodiments of the invention.

FIG. 7 is a diagram that shows an example of a generic computer device 900 and a generic mobile computer device 950, which may be used with the techniques described here. Computing device 900 relates in an exemplary embodiment to the control system 100 (cf. FIG. 1). Computing device 950 is intended to represent various forms of mobile devices, such as personal digital assistants, cellular telephones, smart phones, and other similar computing devices. Such front ends may also be implemented as integral parts of the cooking devices. The master as well as each slave may include such a frontend for implementing the respective I/O means. In an exemplary embodiment of this disclosure the computing device 950 may serve as a frontend control device of the control system 900. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only.

In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, ZigBee, WLAN, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, ZigBee or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for controlling a multi-function cooking apparatus master and at least one multi-function cooking apparatus slave for jointly processing one or more food products, the method comprising:

receiving at least one recipe program for preparing one or more food products using a food processing vessel with a vessel interface, the vessel interface being connectable to a master mechanical interface and a master electrical interface of the multi-function cooking apparatus master that enable a first functional scope of use of the food processing vessel by the multi-function cooking apparatus master, the at least one recipe program including machine readable recipe program instructions configured to control the multi-function cooking apparatus master to execute food processing steps in accordance with the least one recipe program, wherein, for each food processing step, the recipe program provides information about technical capabilities required for the execution of the food processing step, including, for a particular food processing step, required technical capabilities of at least one of a temperature control element and a torque and rotation transmission element of the food processing vessel;

selecting the at least one multi-function cooking apparatus slave from a slave registry, the slave registry having previously received one or more registrations of available slave apparatuses that are locally available for operation in conjunction with the multi-function cooking apparatus master, the slave registry further storing technical capabilities of the available slave apparatuses;

mapping the required technical capabilities for the particular food processing step, as obtained from the recipe program, to technical capabilities of the at least one multi-function cooking apparatus slave, as obtained from the slave registry, wherein the at least one multi-function cooking apparatus slave has a slave mechanical interface and a slave electrical interface that enable a second functional scope of use of the food processing vessel by the multi-function cooking apparatus slave;

determining, based on the mapping, that the second functional scope provides sufficient technical capabilities of the at least one of the temperature control element and the torque and rotation transmission element to execute said particular food processing step;

extracting from the at least one recipe program, based on the determining, a partition including a program instruction subset associated with the particular food processing step;

deploying the extracted partition to the at least one multi-function cooking apparatus slave for execution, and deploying the remaining program partition of the recipe program to the multi-function cooking apparatus master, and executing the remaining program partition of the recipe program using the multi-function cooking apparatus master, including synchronizing the executing of the remaining program partition of the recipe program with an executing of the extracted partition by the at least one multi-function cooking apparatus slave.

2. The method of claim 1, wherein the second functional scope affects anyone of the following technical capabilities of the at least one multi-function cooking apparatus slave: maximum temperature reachable with the temperature control element inside the vessel, maximum temperature accuracy reachable with the temperature control element inside, maximum rotational speed reachable for the torque and rotation transmission element, rotation direction of the torque and rotation transmission element, and torque of the torque and rotation transmission element.

3. The method of claim 1, wherein the second functional scope affects at least one cooking function of the multi-function cooking apparatus slave in that a technical capability of the multi-function cooking apparatus slave is limited to a first parameter range which excludes parameters of a second parameter range wherein the second parameter range requires appropriate safety provisions.

4. The method of claim 1, wherein the second functional scope affects at least one cooking function of the multi-function cooking apparatus slave in that the slave mechanical interface of the multi-function cooking apparatus slave is limited by a particular configuration of the geometry of the slave mechanical interface wherein the particular configuration of the geometry of the multi-function cooking apparatus slave prevents the reception of vessels including a torque and rotation transmission element causing a safety risk for a user.

5. The method of claim 1, wherein the extracted partition is deployed to a first slave and a second slave, the method further comprising:
executing the extracted partition on the first and second slaves in parallel.

6. The method of claim 1, further comprising:
identifying, for a further food processing step, a further slave providing a reduced functional scope with technical capabilities which are sufficient to
execute said further food processing step;
extracting from the at least one recipe program a further partition including a program instruction subset associated with the further food processing step; and
deploying the extracted further partition to the further slave for execution, and deploying the remaining program instructions of the recipe program to the master.

7. The method of claim 1, further comprising:
receiving, by connection of the vessel interface with the slave mechanical interface and the slave electrical interface, the food processing vessel previously used by the master for the execution of earlier food processing steps; and
upon deployment of the extracted partition, executing, by the at least one multi-function cooking apparatus slave, the extracted partition to continue food processing steps using the received food processing vessel in combination with the program instruction subset of the deployed extracted partition.

8. The method of claim 1, wherein the at least one multi-function cooking apparatus slave implements a software switch, further comprising:
detecting that the food processing vessel inserted into the at least one multi-function cooking apparatus slave includes a torque and rotation transmission element with blades in a cutting rotation direction; and
generating control signals for a motor of the at least one multi-function cooking apparatus slave to set the rotation direction to the non-cutting rotation direction.

9. A computer program product for controlling a multi-function cooking apparatus master and at least one multi-function cooking apparatus slave, the computer program product comprising computer readable instructions that when loaded into a memory of a computing device and executed by at least one processor of the computing device cause the computing device to perform the method according to claim 1.

* * * * *